United States Patent
Kawakami

(10) Patent No.: US 8,176,345 B2
(45) Date of Patent: May 8, 2012

(54) POWER SAVING OPERATION FOR A MEDIA DRIVE

(75) Inventor: Hosui Kawakami, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 551 days.

(21) Appl. No.: 12/393,935

(22) Filed: Feb. 26, 2009

(65) Prior Publication Data

US 2009/0323486 A1 Dec. 31, 2009

(30) Foreign Application Priority Data

Jun. 30, 2008 (JP) .................... 2008-170970

(51) Int. Cl.
*G06F 1/32* (2006.01)
(52) U.S. Cl. ............ 713/320; 713/321; 713/323
(58) Field of Classification Search ........... 713/300–340
See application file for complete search history.

(56) References Cited

U.S. PATENT DOCUMENTS

| | | | |
|---|---|---|---|
| 6,523,123 B1* | 2/2003 | Barbee ........................ | 713/300 |
| 7,240,189 B2* | 7/2007 | Mowery et al. .................. | 713/2 |
| 7,409,565 B2 | 8/2008 | Chotoku et al. | |
| 7,568,077 B2 | 7/2009 | Suzuki et al. | |
| 7,836,319 B2* | 11/2010 | Oh et al. ........ | 713/323 |
| 2006/0119878 A1 | 6/2006 | Kurosaki | |
| 2006/0190745 A1* | 8/2006 | Matsushima et al. ......... | 713/300 |
| 2007/0025195 A1 | 2/2007 | Oh et al. | |
| 2007/0094459 A1 | 4/2007 | Suzuki et al. | |
| 2008/0126616 A1 | 5/2008 | Kumasawa et al. | |
| 2009/0019301 A1* | 1/2009 | Minami ........................ | 713/324 |
| 2010/0198995 A1 | 8/2010 | Takamoto | |

FOREIGN PATENT DOCUMENTS

| | | |
|---|---|---|
| JP | 11162101 | 6/1999 |
| JP | 2001-135009 | 5/2001 |
| JP | 2001-297517 | 10/2001 |
| JP | 2003067093 | 3/2003 |
| JP | 2004-005686 | 1/2004 |
| JP | 2005178212 | 7/2005 |
| JP | 2005-209288 | 8/2005 |
| JP | 2005-235336 | 9/2005 |
| JP | 2006-164203 | 6/2006 |
| JP | 2006172198 | 6/2006 |
| JP | 2007035044 | 2/2007 |
| JP | 2007-115120 | 5/2007 |
| JP | 2007-150932 | 6/2007 |
| JP | 2007148980 | 6/2007 |

(Continued)

OTHER PUBLICATIONS

Japanese Patent Application No. 2008-170970, Notice of Reasons for Rejection, mailed May 19, 2009, (English translation).

(Continued)

*Primary Examiner* — Raymond Phan
(74) *Attorney, Agent, or Firm* — Blakely, Sokoloff, Taylor & Zafman LLP

(57) ABSTRACT

According to one embodiment, an information processing apparatus includes a media drive having a normal operation mode and a power saving operation mode in which less power is consumed than in the normal operation mode, a control module configured to control the media drive, and a determination module configured to shift, when it is determined that the control module does not execute data access to the media drive for a predetermined period, the media drive from the normal operation mode to the power saving operation mode.

7 Claims, 4 Drawing Sheets

FOREIGN PATENT DOCUMENTS

| | | |
|---|---|---|
| JP | 2008-041050 | 2/2008 |
| JP | 2008084124 | 4/2008 |

OTHER PUBLICATIONS

Japanese Patent Application No. 2008-170970, Notice of Reasons for Rejection, mailed Sep. 27, 2011, (with English Translation).

Japanese Patent Application No. 2008-170970, Decision of Rejection, mailed Mar. 23, 2010, (with English Translation).

Japanese Patent Application No. 2008-170970, Decision of Dismissal of Amendment, mailed Mar. 23, 2010, (with English Translation).

Japanese Patent Application No. 2008-170970, Final Notice of Rejection, mailed Oct. 20, 2009, (with English Translation).

\* cited by examiner

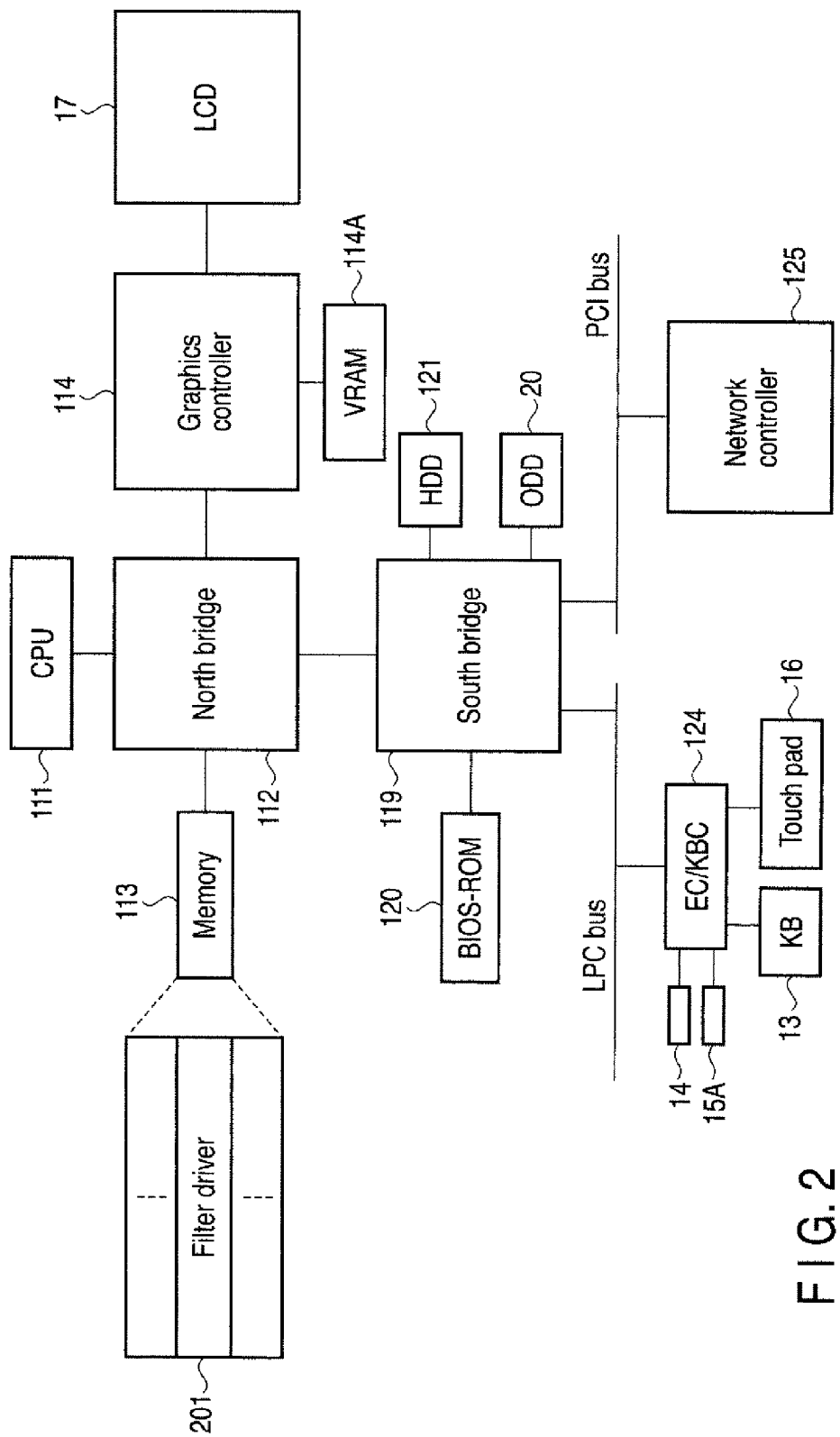
F I G. 2

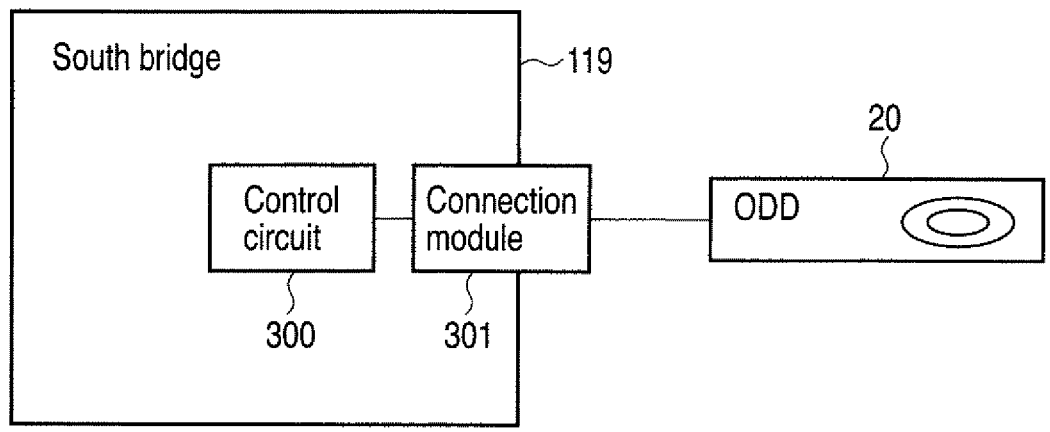
F I G. 3
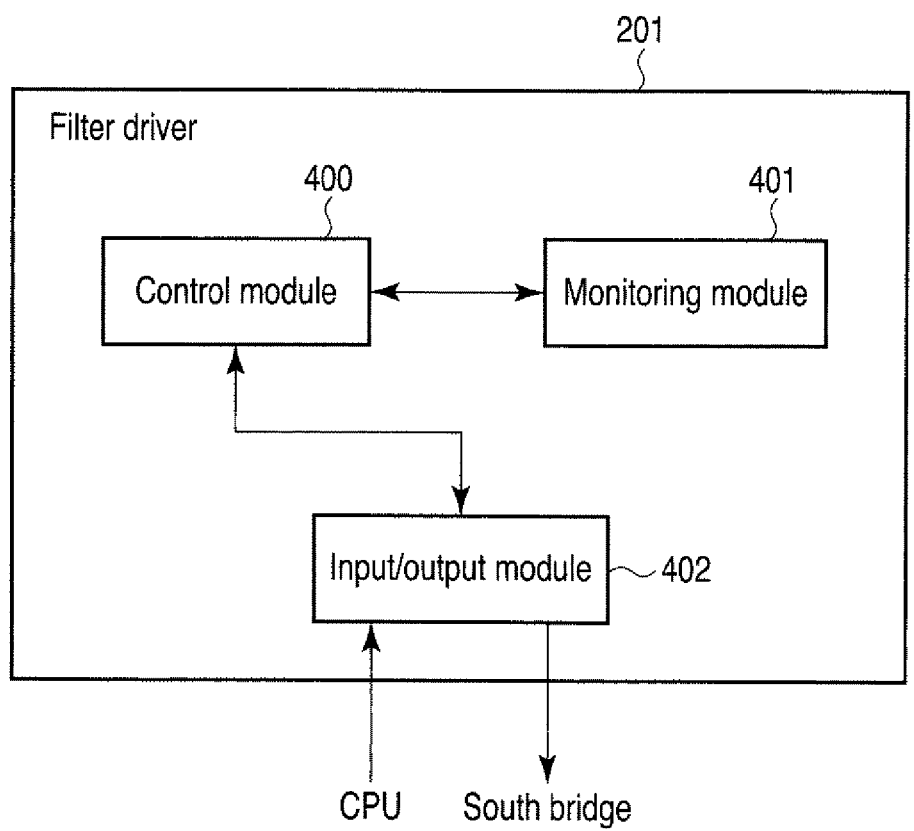
F I G. 4

POWER SAVING OPERATION FOR A MEDIA DRIVE

CROSS-REFERENCE TO RELATED APPLICATIONS

This application is based upon and claims the benefit of priority from Japanese Patent Application No. 2008-170970, filed Jun. 30, 2008, the entire contents of which are incorporated herein by reference.

BACKGROUND

1. Field

One embodiment of the present invention relates to a media drive having a power saving operation mode, and more particularly, to an information processing apparatus, a control method, and a program, which can effectively utilize the power saving operation mode of the media drive.

2. Description of the Related Art

In general, in a system including an optical disk drive, an operating system accesses the optical disk drive by continual polling, and detects the state of the optical disk drive. For example, Jpn. Pat. Appln. KOKAI Publication No. 2005-209288 discloses a technique of detecting the state of an optical disk drive by causing an operating system to access the optical disk drive by continual polling.

In the technique described in Jpn. Pat. Appln. KOKAI Publication No. 2005-209288, however, even if the optical disk drive has a power saving operation mode, it will not shift to this mode since the operating system periodically accesses an optical disk drive by polling. Consequently, the power saving operation mode of the optical disk drive is not effectively used.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing the main components of the information processing apparatus according to the embodiment;

FIG. 3 is an exemplary block diagram showing the connection relationship of an optical disk drive of the information processing apparatus according to the embodiment;

FIG. 4 is an exemplary block diagram showing the functional configuration of a filter driver of the information processing apparatus according to the embodiment;

DETAILED DESCRIPTION

Various embodiments according to the invention will be described hereinafter with reference to the accompanying drawings. In general, according to one embodiment of the invention, an information processing apparatus includes: a media drive having a normal operation mode and a power saving operation mode in which less power is consumed than in the normal operation mode; a control module configured to control the media drive; and a determination module configured to shift, when it is determined that the control module does not execute data access to the media drive for a predetermined period, the media drive from the normal operation mode to the power saving operation mode.

An embodiment of the present invention will be described below with reference to the accompanying drawings.

First, the arrangement of an information processing apparatus according to the embodiment of the present invention will be explained with reference to FIGS. 1 and 2. The information processing apparatus is implemented as, e.g., a notebook computer 10.

Figure 1:
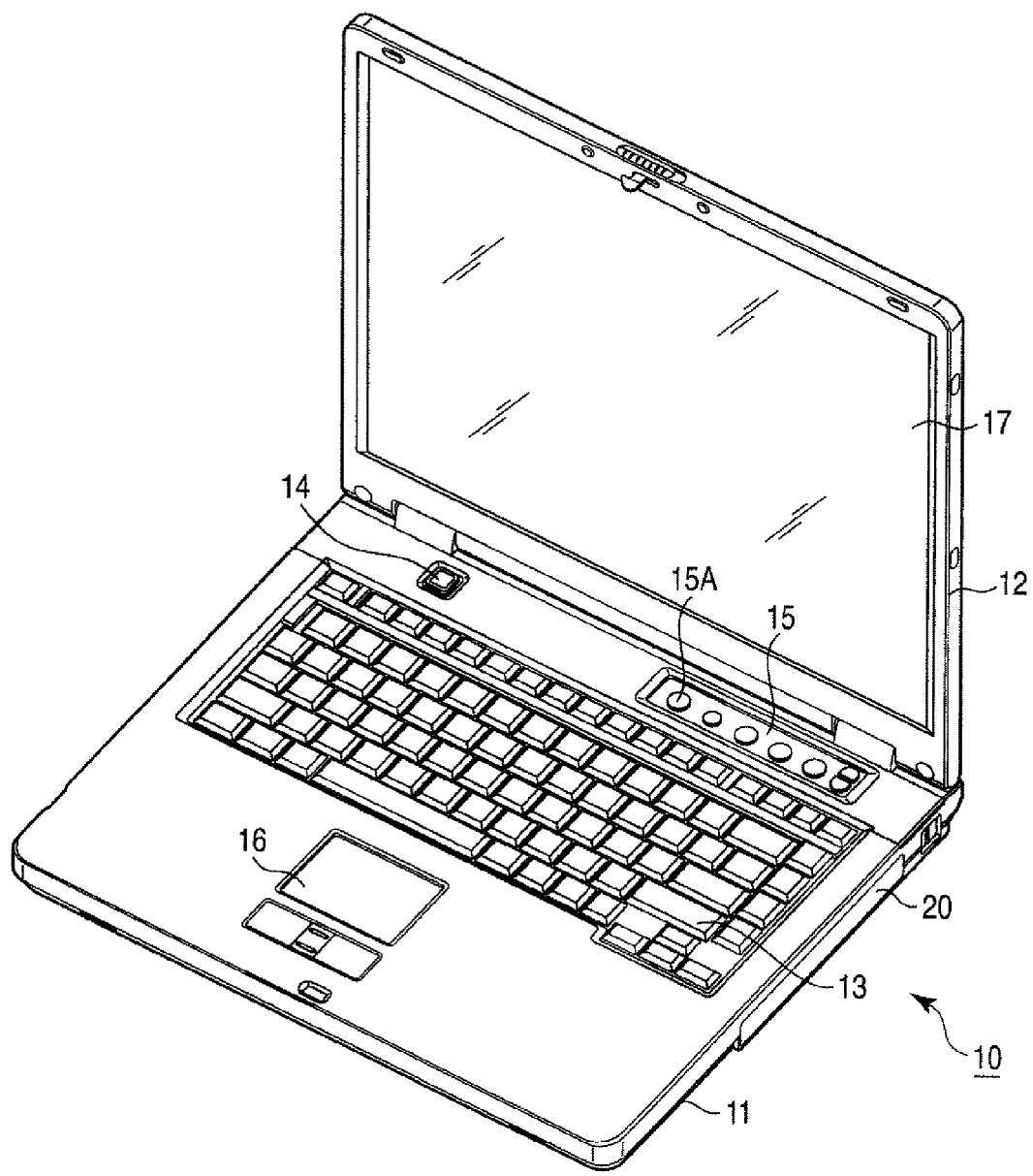
FIG. 1 is an exemplary perspective view showing the outer appearance of an information processing apparatus according to an embodiment of the present invention.

FIG. 1 is a perspective view showing a state in which the display unit of the notebook computer 10 is open. The computer 10 includes a computer main body 11 and a display unit 12. The display unit 12 has a built-in display device formed from a liquid crystal display (LCD) 17. The display screen of the LCD 17 is located almost at the center of the display unit 12.

The display unit 12 is attached to the computer main body 11 to freely pivot between the open position and the closed position. The computer main body 11 has a thin box-like housing and includes, on its upper surface, a keyboard 13, a power button 14 to power the computer 10 on/off, an input operation panel 15, a touch pad 16, and an optical disk drive (ODD [media drive]) 20. Note that although the optical disk drive 20 having a power saving operation mode is used as a media drive in this embodiment, the present invention is not limited to an optical drive and any drive having a power saving operation mode can be used.

The input operation panel 15 is an input device that inputs an event corresponding to a pressed button to a system. The input operation panel 15 has a plurality of buttons to activate a plurality of functions. The buttons include a power saving operation mode cancel button 15A, a TV activation button, and a Digital Versatile Disc (DVD) activation button. Upon pressing the power saving operation mode cancel button 15A when the optical disk drive 20 is in the power saving operation mode, the operation state of the optical disk drive 20 returns to a normal operation mode. The TV activation button is a button to activate a TV function of playing back and recording broadcast program data such as a digital TV broadcast program. When the user presses the TV activation button, a TV application program for executing the TV function is activated. The DVD activation button is a button to play back a video content recorded on a DVD. When the user presses the DVD activation button, an application program for playing back a video content is automatically activated.

The system configuration of the computer 10 will be described next with reference to FIG. 2.

As shown in FIG. 2, the computer 10 includes a CPU 111, a north bridge 112, a (main) memory 113, a graphics controller 114, a south bridge 119, a Basic Input/Output System (BIOS)-ROM 120, a hard disk drive (HDD) 121, the optical disk drive (ODD) 20, an embedded controller/keyboard controller IC (EC/KBC) 124, the power button 14, the power saving operation mode cancel button 15A, and a network controller 125.

The CPU 111 is a processor for controlling the operation of the computer 10, and executes an operating system (OS) and various device drivers such as a filter driver (control module, determination module) 201, which are loaded from the hard disk drive (HDD) 121 to the main memory 113.

The CPU 111 also executes a system BIOS stored in the BIOS-ROM 120. The system BIOS is a program for hardware control.

The north bridge 112 is a bridge device for connecting the local bus of the CPU 111 to the south bridge 119. The north bridge 112 incorporates a memory controller to control access to the main memory 113. The north bridge 112 also has a function of executing communication with the graphics controller 114 via an Accelerated Graphics Port (ASP) bus or the like.

The graphics controller 114 is a display controller for controlling the LCD 17 used as the display monitor of the computer 10. The graphics controller 114 generates, from image data written to a video memory (VRAM) 114A, a display signal to be sent to the LCD 17.

The south bridge 119 controls devices on an Low Pin Count (LPC) bus and devices on a Peripheral Component Interconnect (PCI) bus. The south bridge 119 incorporates an Integrated Drive Electronics (IDE) controller to control the HDD 121 and ODD 20.

The HDD 121 is a storage device for storing various kinds of software and data. The optical disk drive 20 is a drive unit for driving a storage medium such as a DVD storing a video content. The optical disk drive 20 has the normal operation mode and the power saving operation mode (e.g., a standby mode). The power saving operation mode is a mode in which the optical disk drive 20 operates at power less than in the normal operation mode. If the optical disk drive 20 is not accessed for a certain period, it shifts to the power saving operation mode.

The embedded controller/keyboard controller IC (EC/KBC) 124 is a one-chip microcomputer in which an embedded controller for power management and a keyboard controller for controlling the keyboard (KB) 13 and the touch pad 16 are integrated. The embedded controller/keyboard controller IC (EC/KBC) 124 has a function of powering the computer 10 on/off as the user operates the power button 14. The embedded controller/keyboard controller IC (EC/KBC) 124 returns the optical disk drive 20 from the power saving operation mode to the normal operation mode as the user operates the power saving operation mode cancel button 15A. The network controller 125 is a communication device for executing communication with an external network such as the Internet.

The filter driver 201 is a device driver operating between the operating system and the optical disk drive 20. The filter driver 201 determines whether the operating system polls the optical disk drive 20 (whether the operating system sends an inquiry request about the state of the optical disk drive 20). The filter driver 201 effects control to shift the optical disk drive 20 and a control circuit 300 to the power saving operation modes or normal operation modes.

FIG. 3 is a block diagram showing the connection arrangement between the south bridge 119 and the optical disk drive 20. The south bridge 119 includes the control circuit 300 such as a serial ATA controller, and a connection module 301 serving as a connection interface module such as a serial ATA interface. The control circuit 300 has a power saving operation mode similarly to the optical disk drive 20, and shifts to the power saving operation mode in response to a request from the filter driver 201. The control circuit 300 also shifts from the power saving operation mode to the normal operation mode in response to a request from the filter driver 201. The filter driver 201 sends a control signal to the optical disk drive 20 via the control circuit 300 and connection module 301, and effects control to shift the optical disk drive 20 and the control circuit 300 to the power saving operation modes or normal operation modes.

FIG. 4 is a block diagram showing the functional configuration of the filter driver 201. The filter driver 201 includes a control module 400, a monitoring module 401, and an input/output module 402. The control module 400 effects control to shift the optical disk drive 20 and the control circuit 300 to the power saving operation modes or normal operation modes. Furthermore, the control module 400 can send a request to power off the optical disk drive 20 to the control circuit 300 of the south bridge 119 via the BIOS-ROM 120. The monitoring module 401 determines whether the operating system polls the optical disk drive 20 and whether the operating system exchanges data with the optical disk drive 20. Exchanging data includes reading out data from an optical disk in the optical disk drive 20 by the operating system, and writing data to an optical disk in the optical disk drive 20 by the operating system. When determining that the operating system does not transfer data to or from the optical disk drive 20 and only polls the optical disk drive 20, the monitoring module 401 notifies the control module 400 of it. The input/output module 402 is an interface for exchanging commands and data with the CPU 111 and the south bridge 119.

Figure 5:
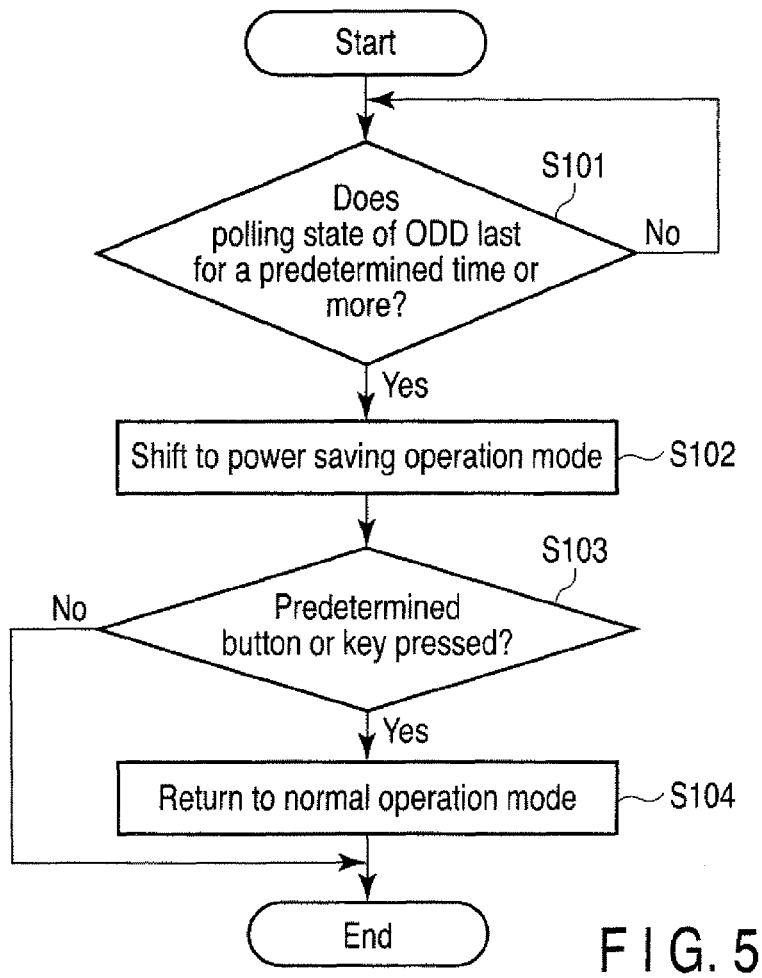
FIG. 5 is an exemplary flowchart for explaining a processing method of the information processing apparatus according to the embodiment.

The processing of a control method and program to which the information processing apparatus having the above-described arrangement of the present invention is applied will be explained with reference to the flowchart of FIG. 5.

The CPU 111 loads the filter driver 201 to the memory 113. The filter driver 201 controlled by the CPU 111 determines whether the operating system does not transfer data to or from the optical disk drive 20 and the operating system only polls the optical disk drive 20 (block S101). In general, when the operating system does not transfer data to or from the optical disk drive 20, the operating system only polls the optical disk drive 20. If the filter driver 201 determines in block S101 that the operating system does not transfer data to or from the optical disk drive 20 and the operating system only polls the optical disk drive 20 (YES in block S101), it sends, to the control circuit 300 of the south bridge 119, a request to shift the optical disk drive 20 and the control circuit 300 to the power saving operation modes, and shifts the optical disk drive 20 and the control circuit 300 to the power saving operation modes (block S102). The optical disk drive 20 and the control circuit 300 shift from the normal operation modes to the power saving operation modes as follows. The control circuit 300 of the south bridge 119 interrupts polling of the optical disk drive 20 from the operating system under the control of the filter driver 201 when the optical disk drive 20 is in the normal operation mode. With this operation, the optical disk drive 20 is not accessed any more, the optical disk drive 20 and the control circuit 300 activate their power saving operation modes, and then they shift to the power saving operation modes. After the optical disk drive 20 and the control circuit 300 shift to the power saving operation modes, the filter driver 201 responds to polling (a state inquiry request) of the optical disk drive 20 from the operating system. The filter driver 201 returns, to the operating system, state information including information on a state before the optical disk drive 20 shifts to the power saving operation mode such as that representing whether an optical disk is inserted in the optical disk drive 20. The filter driver 201 has a display module which executes predetermined display when the optical disk drive 20 and the control circuit 300 are in the power saving operation modes. The display module is, e.g., a light emitting diode (LED) for checking the operation, included in the computer 10. Through, e.g., blinking of the LED, the user can easily determine that the optical disk drive 20 is in the power saving operation mode. Alternatively, a specific icon can be displayed on the display module such as the LCD 17. It is possible to display a predetermined icon representing that the optical disk drive 20 is in the power saving operation mode, and display another icon different from the above predetermined icon to indicate that the optical disk drive 20 is in the normal operation mode. When shifting the optical disk drive 20 and the control circuit 300 to the power saving operation modes, the filter driver 201 can set a predetermined shifting time. For example, the filter driver 201 can set a period, to fall within the range, e.g., from 10 to 60 minutes, from when the operating system stops exchanging data with the optical disk drive 20 until polling of the optical disk drive 20 from the operating system is interrupted. If a period from when polling of the optical disk drive 20 from the operating system is interrupted until the optical disk drive 20 and the control circuit 300 shift to the power saving operation modes is, e.g., 5 minutes, it is possible to set the period until polling of the optical disk drive 20 from the operating system is interrupted in consideration of the period including these 5 minutes.

When shifting to the power saving operation modes, the optical disk drive 20 and the control circuit 300 shift to preset power saving operation modes such as a standby mode. If the filter driver 201 detects press of a predetermined button such as the power saving operation mode cancel button 15A or a predetermined key of the keyboard (YES in block S103), it shifts the optical disk drive 20 from the power saving operation mode to the normal operation mode (block S104).

Figure 6:
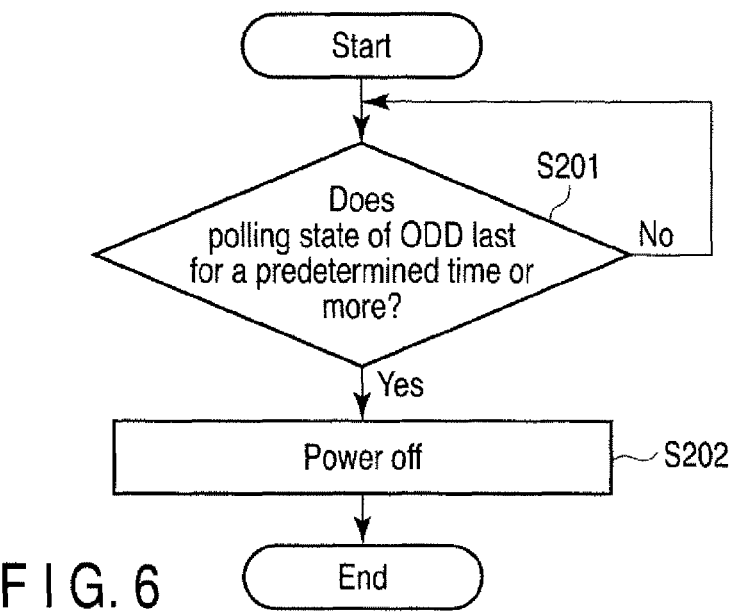
FIG. 6 is an exemplary flowchart for explaining a processing method of the information processing apparatus according to the embodiment.

It is also possible to power off the optical disk drive 20 as needed. For example, as shown in FIG. 6, the CPU 111 loads the filter driver 201 to the memory 113. The filter driver 201 controlled by the CPU 111 determines whether the operating system does not transfer data to or from the optical disk drive 20 and the operating system only polls the optical disk drive 20 (block S201). If the filter driver 201 determines in block S201 that the operating system does not transfer data to or from the optical disk drive 20 and the operating system only polls the optical disk drive 20 (YES in block S201), it sends, to the control circuit 300 of the south bridge 119 via the BIOS-ROM 120, a request to power off the optical disk drive 20, thus powering off the optical disk drive 20 (block S202).

In the above-described embodiment, the processing of shifting the optical disk drive 20 and the control circuit 300 from the normal operation modes to the power saving operation modes under the control of the filter driver 201 has been explained. The filter driver 201 may, however, effect control to shift only the optical disk drive 20 from the normal operation mode to the power saving operation mode.

A module can be accomplished in software and hardware.

It is an object of the present invention to provide an information processing apparatus, a control method, and a program, which can effectively utilize the power saving operation mode of an optical disk drive.

According to the above-described embodiment, it is possible to effectively utilize the power saving operation modes of the optical disk drive and the control circuit. That is, the power saving functions of the control circuit and the optical disk drive become active by controlling access requests from the application to minimize the number of accesses to the control circuit and the optical disk drive, thereby realizing power savings.

Note that since the procedure of the control processing of the embodiment can be implemented by software, it is possible to readily obtain the same effects as in the embodiment only by installing, through a computer-readable storage medium, a program for executing the procedure by a computer having an optical disk drive with a power saving operation mode.

Note that the present invention is not exactly limited to the above embodiments, and constituent elements can be modified upon practice without departing from the spirit and scope of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a media drive having a normal operation mode and a power saving operation mode in which less power is consumed than in the normal operation mode, the media drive being configured to shift from the normal operation mode to the power saving operation mode if access to the media drive is not executed for a first predetermined period; and
a determination module configured to determine whether data access to the media drive is not executed for a second predetermined period, and to interrupt an inquiry request, which is sent from an operating system to the media drive, in order to shift the media drive from the normal operation mode to the power saving operation mode if it is determined that the data access to the media drive is not executed for the second predetermined period,
wherein the determination module is further configured to return state information to the operating system if the determination module receives the inquiry request from the operating system while the media drive is in the power saving operation mode, the state information indicating a state in which the media drive is before the media drive shifts to the power saving operation mode.

2. The apparatus of claim 1, wherein one or both of the information processing apparatus and the media drive have a predetermined button, and when the predetermined button is pressed, the media drive returns from the power saving operation mode to the normal operation mode.

3. The apparatus of claim 1, further comprising a display module configured to execute, when the media drive is in the power saving operation mode, predetermined display.

4. A control method used in an information processing apparatus that includes a media drive having a normal operation mode and a power saving operation mode in which less power is consumed than in the normal operation mode, the media drive being configured to shift from the normal operation mode to the power saving operation mode if access to the media drive is not executed for a first predetermined period, the method comprising:
determining whether data access to the media drive is not executed for a second predetermined period;
interrupting an inquiry request, which is sent from an operating system to the media drive, in order to shift the media drive from the normal operation mode to the power saving operation mode if it is determined that the data access to the media drive is not executed for the second predetermined period; and returning state information to the operating system if the inquiry request is received from the operating system while the media drive is in the power saving operation mode, the state information indicating a state in which the media drive is before the media drive shifts to the power saving operation mode.

5. The method of claim 4, wherein one or both of the information processing apparatus and the media drive have a predetermined button, and when the predetermined button is pressed, the media drive returns from the power saving operation mode to the normal operation mode.

6. The method of claim 4, wherein the information processing apparatus further includes a display module, and when the media drive is in the power saving operation mode, predetermined display is executed on the display module.

7. A computer-readable storage medium having stored thereon a computer program which is executable by a computer that includes a media drive having a normal operation mode and a power saving operation mode in which less power is consumed than in the normal operation mode, the media drive being configured to shift from the normal operation mode to the power saving operation mode if access to the media drive is not executed for a first predetermined period, the computer program controlling the computer to execute functions of:

determining whether data access to the media drive is not executed for a second predetermined period;

interrupting an inquiry request, which is sent from an operating system to the media drive, in order to shift the media drive from the normal operation mode to the power saving operation mode if it is determined that the data access to the media drive is not executed for the second predetermined period; and returning state information to the operating system if the inquiry request is received from the operating system while the media drive is in the power saving operation mode, the state information indicating a state in which the media drive is before the media drive shifts to the power saving operation mode.

\* \* \* \* \*